United States Patent [19]

Haeusler et al.

[11] 3,733,475
[45] May 15, 1973

[54] DIGITAL PULSE SEQUENCE DIVIDER

[75] Inventors: Jochen Haeusler, Nurnberg-Laufamholz; Wolfgang Wagnerberger, Nurnberg, both of Germany

[73] Assignee: Siemens Aktiengesellschaft, Berlin and Munchen, Germany

[22] Filed: Nov. 10, 1970

[21] Appl. No.: 88,351

[30] Foreign Application Priority Data

Nov. 22, 1969  Germany..................P 19 58 622.0

[52] U.S. Cl..................................235/156, 328/39
[51] Int. Cl............................G06f 7/52, H03k 29/00
[58] Field of Search......................235/156, 152, 164; 328/39; 307/225

[56] References Cited

UNITED STATES PATENTS

| | | |
|---|---|---|
| 3,230,352 | 1/1966 | Grondin et al. ...................235/156 |
| 3,283,131 | 11/1966 | Carbrey............................235/156 X |
| 3,418,582 | 12/1968 | Davies..................................328/39 |
| 3,525,039 | 8/1970 | Mindheim .......................235/152 X |
| 3,538,442 | 11/1970 | Arkell et al............................328/39 |

*Primary Examiner*—Malcolm A. Morrison
*Assistant Examiner*—David H. Malzahn
*Attorney*—Curt M. Avery, Arthur E. Wilford, Herbert L. Lerner and Daniel J. Tick

[57]  ABSTRACT

A computer determines the pulse intervals of an output pulse sequence which lead to optimization between two pulses of the output pulse sequence. The computer adds, subtracts and compares integral numbers and determines the pulse intervals in order to prepare the next pulse of the output pulse sequence. The computer avoids division, so that it provides a result which is free of round-off errors. A counter responds to the pulses of the input pulse sequence and releases pulses of the output pulse sequence under the control of the computer, in accordance with $a$ or $a + 1$ pulses of the input pulse sequence.

6 Claims, 4 Drawing Figures

DIGITAL PULSE SEQUENCE DIVIDER

DESCRIPTION OF THE INVENTION

The invention relates to a digital pulse sequence divider. More particularly, the invention relates to a digital pulse sequence divider for optimally uniform distribution of pulses of an output pulse sequence selected from an equidistantly spaced input pulse sequence.

The output pulse sequence is identified herein by n and the input pulse sequence is identified herein by N. In the digital art, there is often a problem which arises from the necessity for deriving, from a sequence of N equidistantly spaced pulses, through a selection of specific pulses of such sequence, a new sequence of $n$ pulses. The new sequence of $n$ pulses must have the best or optimal uniform distribution and $n$ must be less than N. The pulses of the new sequence may be equidistantly spaced in either time or space.

In problems related to digital control, if the pulses of the input sequence have equal time intervals, they may be assigned a frequency. Any component devices or components which do not produce output pulses equidistantly spaced from each other have the effect of generating subharmonic oscillations. Subharmonic oscillations may sometimes inadvertently effect sluggish regulating systems.

A spatial concept of equidistance between pulses is found in the digital-incremental and in the digital-absolute representation of angular displacements through pulse sequences which are utilized, for example, in the operation of rotary resolvers or digitizers and encoders. An uneven distribution of the pulses of a pulse sequence assigned to a complete rotation of 360° would result directly in errors in the angular measurement or resolution.

The problem of distributing the pulse sequence occurs, for example, when a magnitude subdivision is transferred to rotary resolver discs, whereby a pulse sequence generator such as a rotary resolver, which represents $360° = 180,000$ pulses, must also be utilized to represent coarser divisions of only $n$ pulses.

In the aforedescribed problems of pulse sequence distribution, the quotient N/$n$ represents an indication or measure of the ideal uniform distribution which may only be obtained at the predetermined equidistant spacing of the N pulses of the input pulse sequence, when $n$ is included in N as a divisor. Usually, the equidistance of spacing between the pulses is impaired in the output pulse sequence of n pulses. The optimally uniform distribution obtainable for this type of pulse sequence may be provided if the intervals between two arbitrarily successive pulses of the output pulse sequence differ at the most by only one pulse of the input pulse sequence.

The next smaller integer relative to the quotient N/$n$ is denoted by $a$. After a pulse of the input pulse sequence, released for the output pulse sequence, only the $a^{th}$ or the $a^{th} + 1$ pulse of the input pulse sequence may be provided as the next pulse of the output pulse sequence.

German Published application No. 1,285,538 discloses digital pulse dividers, particularly in decade steps. These pulse dividers do not function in the aforedescribed optimal manner. This means that in the output pulse sequences produced by the pulse dividers, the pulse intervals differ more than one pulse of the input pulse sequence. Furthermore, such dividers, although they provide the best possible distribution, but not the optimum distribution, have other limitations. The German published application discloses a decade frequency divider wherein N equals $10^m$; $m$ is an integer, and is thus not arbitrarily selectable. In this frequency divider, the intervals of the output pulse sequences differ, despite the aforedescribed limitation, by as much as five pulses of the input pulse sequence.

The principal object of the invention is to provide a new and improved digital pulse sequence divider.

An object of the invention is to provide a digital pulse sequence divider which overcomes the disadvantages of known digital pulse sequence dividers.

An object of the invention is to provide a digital pulse sequence divider which avoids division and eliminates round-off errors.

An object of the invention is to provide a digital pulse sequence divider which provides an output pulse sequence having pulses of optimum uniformity.

An object of the invention is to provide a digital pulse sequence divider of simple structure which functions with efficiency, effectiveness and reliability.

In accordance with the invention, a pulse sequence divider includes a computer which operates to provide pulse intervals required for the optimum uniform distribution of the pulses of the output pulse sequence. The pulse intervals of the output pulse sequence correspond to $a$ or $a + 1$ pulses of the input pulse sequence. The computer determines the pulse intervals of the output pulse sequence by addition, subtraction and comparison of integral numbers derived from the quotient N/$n$ and avoids division and round-off errors. The pulses are supplied to a counter which indicates or responds to the pulses of the input pulse sequence and releases a pulse of the output pulse sequence under the control of the computer, in accordance with $a$ or $a + 1$ pulses of the input pulse sequence.

In accordance with the invention, a digital pulse sequence divider for optimally uniform distribution of an output pulse sequence $n$ selected from an input pulse sequence N having equal intervals, comprises a computer for providing the pulse intervals for the optimally uniform distribution of the pulses of the output pulse sequence corresponding to $a$ or $a + 1$ pulses of the input pulse sequence, where $$N/n = a + Z/N'$$

wherein $N$ is the number of pulses of the input pulse sequence, $n$ is the number of pulses of the output pulse sequence, $a$ is the integral quotient $N/n$ and $Z/N'$ is the remainder. The computer has input means for supplying the input pulse sequence, computing means connected to the input means for adding, subtracting and comparing integral numbers derived from the quotient N/$n$ and output means connected to the computing means for providing the $a$ or $a + 1$ pulses. A counter has input means connected to the output means of the computer and output means for counting the pulses of the input pulse sequence to provide at the output means the $a$ or $a + 1$ pulses of the input pulse sequence as the output pulse sequence under the control of the computer.

The computing means of the computer comprises a parallel adder having inputs and outputs and a plurality of memory means having inputs connected to the input means of the computer and outputs coupled to the inputs of the parallel adder. The outputs of the parallel adder are coupled to inputs of the memory means.

The memory means comprises a first memory for storing a binary representation of $2N'$, a second memory for storing a binary representation of the binary complement of $2Z$ and a third memory for storing a binary representation of $N'$.

The output means of the computer is connected to an output of the third memory. The parallel adder stores a binary representation of the sum of $N'$ and the binary complement of $2Z$. The computing means of the computer includes clearing means connected to the third memory and the parallel adder for clearing the third memory and the parallel adder.

The pulse sequence divider of the invention is thus able to derive an output pulse sequence $n$ having a number of pulses $n$ from an input pulse sequence $N$ having a number of pulses $N$, wherein $n$ is less than $N$. The pulses of the output pulse sequence are thus distributed with optimum uniformity in the aforedescribed sense. The basically preferred number $N$ is merely limited by the capacity of the memories or counters to $$N = N_0 < \infty$$

for example. However, this does not represent a true limit of the operation of the divider which, as hereinafter described, is principally free of rounding-out or round-off errors, which is at an arbitrary $$N \leq N_0$$

We have discovered that the determination of pulse intervals of $a$ or $a + 1$ pulses of the input pulse sequence resulting in optimally uniform distribution, may be provided without division, even when the quotient $N/n$ is in the form $$N/n = a + Z/N'$$

wherein $a$, $Z$ and $N'$ are integers, and $N'$ is not fully divisible into $Z$.

The quotient $Z/N'$ is a proper fraction which obviates the ideal uniform distribution. The optimum uniform distribution is provided when the $n$ multiples are rounded down or up from $N/n$ to the next integral, depending upon whether or not the non-integer content is less than one half. The non-integer content less than one half is the criterion for $a$ and the non-integer content not less than one half is the criterion for $a + 1$. If the decimal fraction form is selected during the representation of the non-integer, then, as for example are $1/3 = 0.\overline{3}$, infinite decimal fractions would result. Thus, at a finite output, the comparison could be effected with 1/2, only with rounded-off errors. By contrast, the selection of $a$ or $a + 1$ is provided free from rounded-off errors in the pulse divider of our invention.

In order that the invention may be readily carried into effect, it will now be described with reference to the accompanying drawings, wherein.

Figure 1:
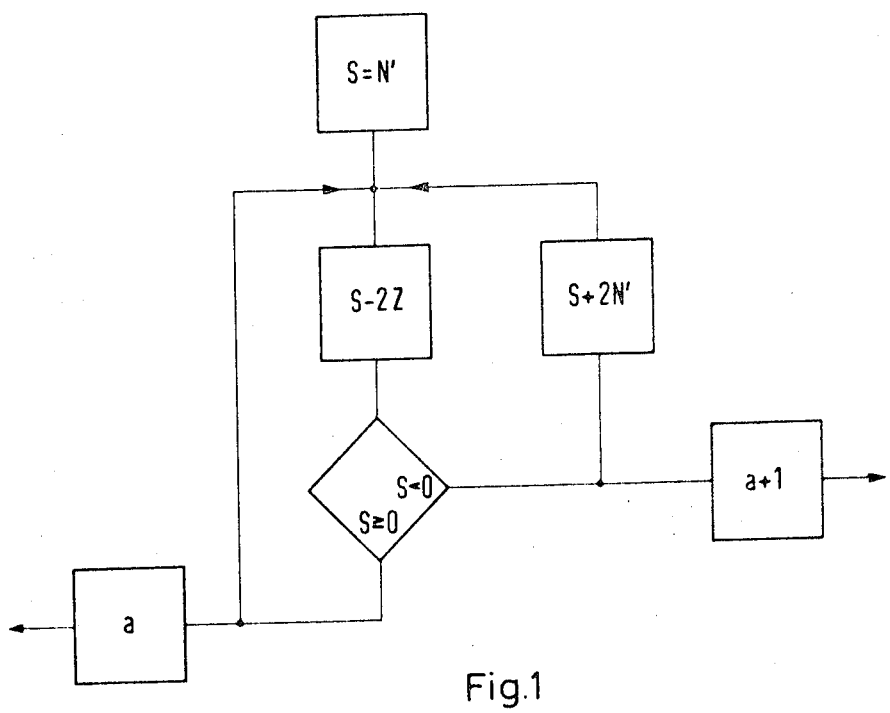
FIG. 1 is a flow sheet of the pulse sequence divider of the invention.

The flow sheet of FIG. 1 illustrates the general mode of operation of the pulse sequence divider of the invention. The initial memory value S equals $N'$. The magnitude $2Z$ is subtracted from the initial memory value S and the difference $S - 2Z$ is recorded as a new memory value. If the new memory value is equal to or greater than zero, the next pulse interval must be $a$ and if this value is less than zero, the next pulse interval must be $a + 1$. In the latter instance, the memory value must be further increased by $2N'$. After the signal is prepared for $a$ or $a + 1$, the magnitude $2Z$ is subtracted again, as soon as a pulse of the output signal is included in the prepared signal.

Figure 4:
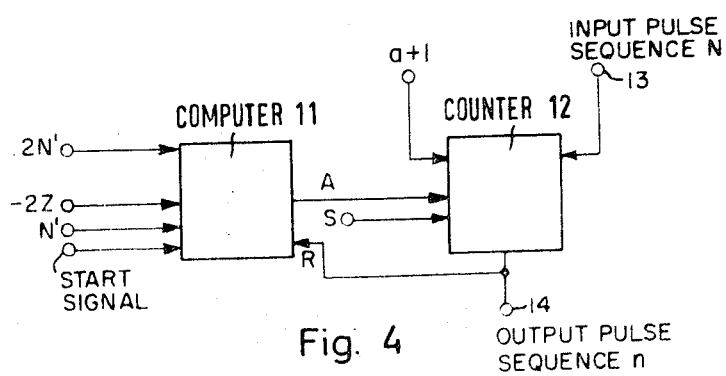
FIG. 4 is a block diagram of the pulse sequence divider of the invention.
Figure 2:
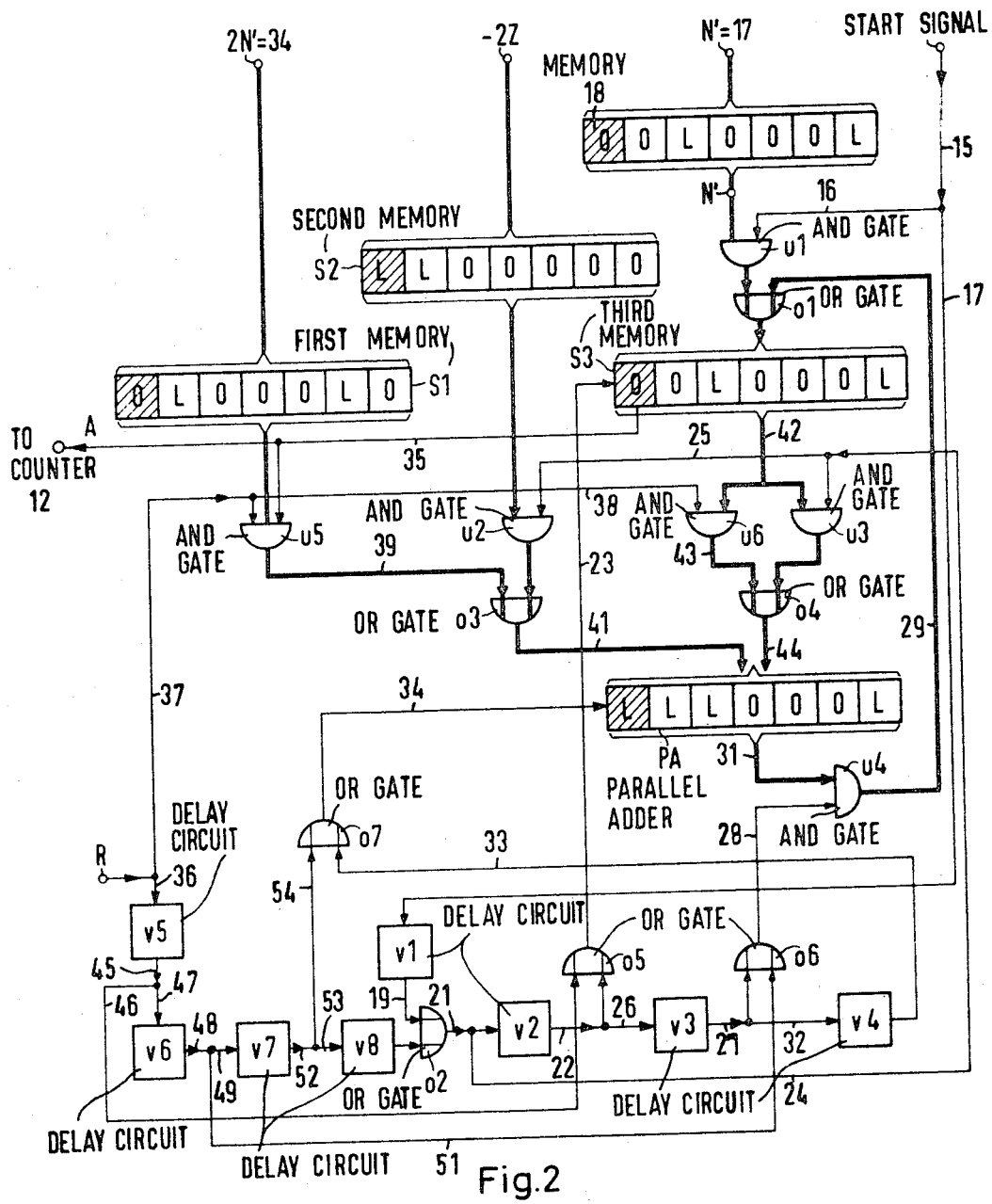
FIG. 2 is a block diagram of an embodiment of the logical connection of the computer of the pulse sequence divider of the invention.
Figure 3:
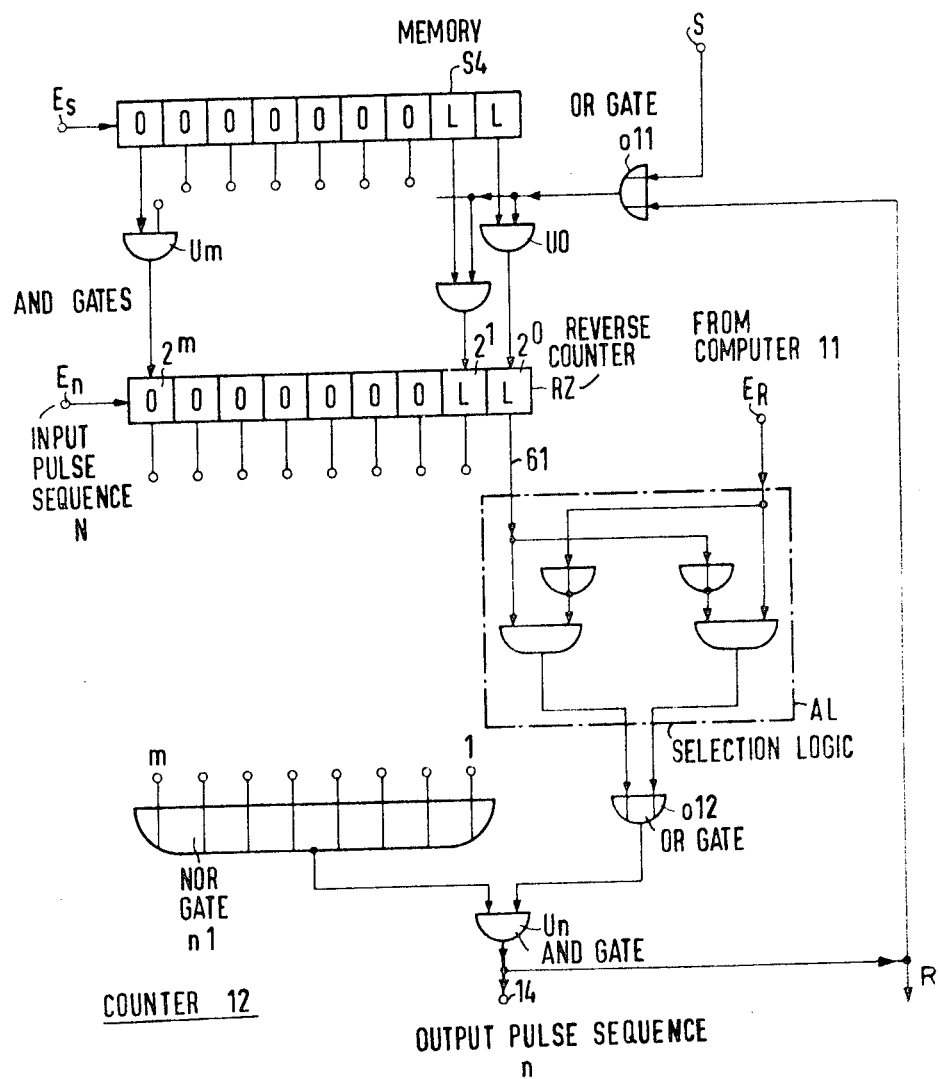
FIG. 3 is a block diagram of an embodiment of the logical connection of the counter of the pulse sequence divider of the invention.

The flow sheet of FIG. 1 is indicative of the operation of the digital pulse sequence divider of the invention, as illustrated in FIG. 4. As shown in FIG. 4, the pulse sequence divider of the invention comprises a computer 11 and a counter 12. The computer 11 is shown in FIG. 2 and the counter 12 is shown in FIG. 3.

In FIG. 4, the input pulse sequence $N$ is supplied to an input terminal 13 which is connected to an input of the counter 12. The output of a computer 11 is connected to an input of the counter 12. The output of the counter 12 is connected to an output terminal 14 at which the output pulse sequence $n$ is provided. By means of the counter 12, the pulses of the output pulse sequence $n$ are eliminated from the pulses of the input pulse sequence $N$.

The operation of the digital pulse sequence divider of the invention is illustrated by the following example. An output pulse sequence $n$ having 17 pulses is to be derived from an input pulse sequence $N$ having 50 pulses, with optimally uniform distribution.

Since $$N/n = a + Z/N'$$

then, $$50/17 = 2 + 16/17$$

This is the result of the normal division of 50 by 17 which results in the quotient 2 and a remainder of 16/17. Thus, $a$ equals 2, $Z$ equals 16, $N'$ equals 17, $N$ equals 50 and $n$ equals 17. Therefore, $2N'$ equals 34 and $2Z$ equals 32. Since S equals $N'$, S equals 17.

FIG. 2 illustrates the circuit arrangement of the computer 11 and FIG. 3 illustrates the circuit arrangement of the counter 12. Each of the computer 11 and the counter 12 functions, for example, with binary numbers.

As shown in FIG. 2, a computer 11 comprises three memories consisting of a first memory S1, a second memory S2 and a third memory S3. The first memory S1 stores the positive number $2N'$, which in the present example equals 34, in the binary code representation 0L000L0. In this binary representation, the first bit on the right, which is 0, would indicate "1" if it were a signal L. The second bit from the right indicates the magnitude "2". The third bit from the right, which is 0, would indicate the magnitude "4" if it were an L. The fourth bit from the right, which is 0, would represent the magnitude "8", if it were an L. The fifth bit from the right, which is 0, would represent the magnitude "16" if it were L. The sixth bit from the right represents the magnitude "32". The last bit on the left, which is 0, would represent the magnitude "64" if it were an L.

In the first memory S1, the last bit position on the left, which is hatched, contains the polarity sign and is 0. The leads, lines, electrical conductors, and the like, which symbolize the transfer of a signal for several bit positions, are indicated in heavier lines than the lines representing the electrical conductors for the control signals.

The magnitude $2Z$ equals 32, as hereinbefore indicated, so that the magnitude $-2Z$ is the binary complement of the magnitude 32 and is therefore 96. The magnitude $-2Z$, or 96, in the present example, is stored in the second memory S2, which therefore has a binary representation of LL00000, in a known manner. The last bit position on the left indicates the polarity sign, is denoted by hatched lines, and stores the L signal. The negative polarity, negative sign or minus is thus indicated by an L signal and the positive polarity, positive sign or plus is indicated by a 0 signal. Zero is, of course, also indicated by a 0 signal.

The number $N'$, which in the present example is 17, is stored in the third memory S3. The third memory S3 thus stores the binary representation 00L000L. The number 17 is read into the third memory S3 by a start signal L via a lead 15, a lead 16, an AND gate $u1$ and an OR gate $o1$. The start signal is simultaneously supplied to the input of a delay circuit $v1$ via the lead 15 and a lead 17.

The number $N'$ is read into the third memory S3 via the AND gate $u1$, since said number is first stored in a memory 18, the outputs of which are connected to the AND gate $u1$, so that when the start signal is supplied to said AND gate, the contents of said memory are transferred via said AND gate, and the OR gate $o1$, to the third memory S3.

After the number $N'$ is read into the third memory S3, the delay circuit $v1$ supplies a signal L to the third memory S3 via a lead 19, an OR gate $o2$, a lead 21, a delay circuit $v2$, a lead 22, an OR gate $o5$ and a lead 23. The delay circuit $v1$ simultaneously supplies a signal L to an AND gate $u2$ via the lead 19, the OR gate $o2$, the lead 21, a lead 24 and a lead 25, and to an AND gate $u3$ via the lead 19, the OR gate $o2$, the lead 21 and the lead 24. The L signal supplied to the third memory S3 from the delay circuit $v1$ is for the read-in of the number $N'$, in its binary representation 00L000L, to a parallel adder PA.

The L signal supplied to the AND gate $u2$ is for the read-in of the magnitude $-2Z$ to the parallel adder PA, in the binary representation LL00000, via OR gate $o3$ and. This is accomplished by the outputs of the second memory S2 being connected to the AND gate $u2$, the output of said AND gate being connected to the OR gate $o3$ and the output of said OR gate being connected to the inputs of the parallel adder PA. The outputs of the third memory S3 are connected to the AND gate $u3$ and an AND gate $u6$. The outputs of the AND gates $u3$ and $u6$ are connected to the OR gate $o4$, the output of which OR gate is connected to the inputs of the parallel adder PA. The parallel adder PA thus stores the sum $$N' + (-2Z)$$

which is represented in binary form as LLL000L. The binary representation LLL000L is for the magnitude 113, which is 17 + 96, or the magnitude of the number $N'$ and the magnitude of the number $-2Z$, as presented in the present example.

During the foregoing operation, the start signal is supplied to the delay circuit $v2$ via the leads 15 and 17 and clears the third memory S3 via the lead 22, the OR gate $o5$ and the lead 23. The start signal in the lead 22 is supplied to the third memory S3 from the delay circuit $v2$ via the lead 22, a lead 26, a delay circuit $v3$, a lead 27, an OR gate $o6$, a lead 28, an AND gate $u4$, leads 29 and an OR gate $o1$. When the start signal is supplied to the third memory S3, the binary representation LLL000L which is stored in the parallel adder PA is read from said parallel adder into the clear memory S3 via leads 31 from the outputs of said parallel adder, the AND gate $u4$, the leads 29 and the OR gate $o1$.

After the transfer of the contents of the parallel adder PA to the third memory S3, the start signal is supplied from the delay circuit $v3$ via the lead 27, a lead 32, a delay circuit $v4$, a lead 33, an OR gate $o7$ and a lead 34 to said parallel adder and clears said parallel adder. This completes the passage through the first cycle up to the decision of whether S is equal to or greater than zero or is less than zero, in accordance with the flow sheet of FIG. 1. The last bit position on the left of the third memory S3, which indicates the sign or polarity, maintains at an output terminal A, which is connected to the input of the counter 12, the decisive signal for the selection of $a$ or $a + 1$. The last bit position on the left of the third memory S3 is connected to the output terminal A via a lead 35.

In the illustrated example, a signal L is in the bit position of the polarity or sign, as transferred from the parallel adder PA to the third memory S3. This means that the $a + 1^{th}$ pulse, which is, in the illustrated example, the third pulse, since $a$ equals 2, is selected from the input pulse sequence $N$. An input terminal R is connected to a delay circuit $v5$ via a lead 36, to an AND gate $u5$ via a lead 37 and to the AND gate $u6$ via a lead 38. Depending upon whether the first difference results in a positive or negative number, and following $a$, which is equal to 2, or $a + 1$, which is equal to 3, pulses of the input pulse sequence $N$, a signal L is supplied at the input terminal R when a pulse of the output pulse sequence is set.

The signal supplied to the input terminal R is supplied directly to the AND gates $u5$ and $u6$ via the lead 37 and the leads 37 and 38, respectively. Since a signal L is provided at the output terminal A, $S3 + 2N'$, which is $-15 + 34$, is formed, in accordance with the right hand loop of the flow sheet of FIG. 1, and is read into the parallel adder PA.

When a signal 0 is at the output terminal A, the AND gate $u5$ remains in its non-conductive condition and a signal 0 is read into the parallel adder PA, along with the contents of the third memory S3. The signal 0 is read into the parallel adder PA via leads 39 from the AND gate $u5$ to the OR gate $o3$, said OR gate, and leads 41 from said OR gate to said parallel adder. The contents of the third memory S3 are read into the parallel adder PA via leads 42 from the outputs of said third memory, the AND gate $u6$, leads 43 from said AND gate to the OR gate $o4$, said OR gate, and leads 44 from said OR gate to the inputs of said parallel adder.

Independently of the computation $S3 + 0$ or $S3 + 2N'$, the third memory S3 is cleared by the signal L supplied at the input terminal R, via the delay circuit $v5$, a lead 45, a lead 46, the OR gate $o5$ and the lead 23, upon the transfer of said signal L by said delay circuit.

The output of a delay circuit $v6$ is connected in parallel with the output of the delay circuit $v5$. The output of a delay circuit $v7$ is connected in parallel with the output of the delay circuit v4. The output of a delay circuit v8 is connected in parallel with the output of the delay circuit v1. The delay circuit v5 is connected to the delay circuit v6 via the lead 45 and a lead 47. The output of the delay circuit v6 is connected to the input of the delay circuit v7 via leads 48 and 49 and is connected to an input of the OR gate o6 via a lead 51, so that the outputs of the delay circuit v3 and the delay circuit v6 are connected to the inputs of the OR gate o6.

The output of the delay circuit v7 is connected to the input of the delay circuit v8 via leads 52 and 53, and to an input of the OR gate o7 via a lead 54. The outputs of the delay circuits v4 and v7 are thus connected to the inputs of the OR gate o7. The output of the delay circuit v8 is connected to an input of the OR gate o2, as is the output of the delay circuit v1.

The aforedescribed operation continues until the parallel adder PA is cleared in accordance with the computation S3 − 2Z. As a result, the selected signal for the next pulse of the output pulse sequence is prepared or readied at the output terminal A in the polarity or sign bit position of the third memory S3. The signals provided by the computer 11 for the selection of $a$ and $a + 1$ are supplied to the counter 12 of FIG. 3 via the output terminal A of said computer and an input terminal $E_R$ of said counter.

In the counter 12 of FIG. 3, a memory S4 of known type is set to $a + 1$ via an input terminal $E_s$. The memory S4 is thus set to 3 in the illustrated example. The memory S4 is thus set to the binary representation 0000000LL. The binary representation stored in the memory S4 is transferred to a reverse counter RZ of known type via a plurality of AND gates U0 to Um.

The input pulse sequence $N$, of 50 pulses in the illustrated example, is supplied to the reverse counter RZ via an input terminal $E_n$. The reverse counter RZ thus stores the binary representation for the number 3 which is 0000000LL. The contents of the reverse counter RZ are transferred to a NOR gate $n1$ where they are examined relative to 0. The outputs $2'$ to $2^m$ of the reverse counter RZ is thus connected to a corresponding input of the NOR gate $n1$. The output of the reverse counter RZ for the binary bit position $2^0$ is connected to an input of a selection logic AL via a lead 61. An input terminal $E_R$ is connected to another input of the selection logic AL. The selection logic AL releases the output pulses.

The output pulses are released by the selection logic AL after $a$, or 2 in the illustrated example, or $a + 1$, or 3 in the illustrated example, input pulses are supplied to the input terminal $E_n$. The output pulses released by the selection logic AL are transferred to the output terminal 14 (FIG. 4) via an OR gate o12 and an AND gate Un, in accordance with the signals supplied to the input terminal $E_R$. The selection logic AL thus releases the output pulses in accordance with whether or $a + 1$ corresponds to L at the input terminal $E_R$. The NOR gate $n1$ meets the requirements for setting output pulses, that is, that the bit positions $2'$ to $2^n$ are 0.

When there is an L signal in the bit position $2^0$, the selection logic AL transfers to the AND gate Un only one L signal, when a 0 signal is supplied to the input terminal $E_R$, which means that a pulse interval of $a = 2$ is required. When a 0 signal is in the bit position $2^0$, only one L signal is transferred to the output of AND gate Un, when an L signal is supplied to the input terminal $E_R$, which means that a pulse interval $a + 1 = 3$ is required.

When the pulse of the output pulse sequence is set, the reverse counter RZ is again set to $a + 1 = 3$, via the OR gate o11, prior to the supply of the next pulse of the input pulse sequence. Furthermore, the output pulse initiates the determination of the next pulse interval, which is effected in the aforedescribed manner.

It is obvious that the digital pulse sequence divider of the invention may also be provided with a binary-decimal or other representation, rather than binary representation, utilized in digital technology. In such case, the appropriate counters, memories, adders, and the like, are utilized. Furthermore, it is not difficult to provide other dividers for selecting the pulse intervals $a$ and $a + 1$ which result in an optimal uniform distribution of output pulses, without rounding-off errors. Such dividers perform division via a coincidence gate which transfers pulses of the output pulse sequence when a counter which registers the pulses of the output pulse sequence has the same count as a memory storing a fixed comparison number.

While the invention has been described by means of a specific example and in a specific embodiment, we do not wish to be limited thereto, for obvious modifications will occur to those skilled in the art without departing from the spirit and scope of the invention.

We claim:

1. A digital pulse sequence divider for optimal uniform distribution of an output pulse sequence $n$ selected from an input pulse sequence $N$ having equal intervals, said divider comprising a computing system for providing the pulse intervals for the optimal uniform distribution of the pulses of the output pulse sequence corresponding to $a^{th}$ or $a^{th} + 1$ pulses of the input pulse sequence from given integral numbers, where $$N/n = a + Z/N'$$

wherein $N$ is the number of pulses of the input pulse sequence. $n$ is the number of pulses of the output pulse sequence, $a$ is the integral quotient $N/n$ and $Z/N'$ is the remainder, $N'$, $Z$ and $a + 1$ being setting parameters previously supplied in the computing system and $N$ being an operating input value from which $n$ is derived, said computing system having input means for supplying the setting parameters therein, computing means connected to said input means for adding, subtracting and comparing the given integral numbers, and counter means having input means connected to said computing means for supplying the $a^{th}$ and $a^{th} + 1$ pulses from said computing means to said counter means and other input means for supplying the input pulse sequence $N$ to said counter means and for supplying the $a^{th} + 1$ pulses to said counter means, said counter means further having output means and feedback means connecting the output means to said computing means, said counter means counting the pulses of the input pulse sequence to provide at the output means of said counter means the $a^{th}$ or $a^{th} + 1$ pulses of the input pulse sequence as the output pulse sequence for a given starting pulse under the control of the computing system.

2. A digital pulse sequence divider as claimed in claim 1, wherein the computing means of said computing system comprises a parallel adder having inputs and outputs and a plurality of memory means having inputs connected to the input means of said computing system and outputs coupled to the inputs of the parallel adder, the outputs of the parallel adder being coupled to inputs of the memory means.

3. A digital pulse sequence divider as claimed in claim 2, wherein said memory means comprises a first memory for storing a binary representation of $2N'$, a second memory for storing a binary representation of the binary complement of $2Z$ and a third memory for storing a binary representation of $N'$.

4. A digital pulse sequence divider as claimed in claim 3, wherein the output means of the computing system is connected to an output of the third memory.

5. A digital pulse sequence divider as claimed in claim 3, wherein the parallel adder stores a binary representation of the sum of $N'$ and the binary complement of $2Z$.

6. A digital pulse sequence divider as claimed in claim 3, wherein the computing means of said computing system includes clearing means connected to the third memory and the parallel adder for clearing said third memory and said parallel adder.

* * * * *